(12) United States Patent
Shiratori et al.

(10) Patent No.: US 7,759,279 B2
(45) Date of Patent: Jul. 20, 2010

(54) EXHAUST GAS PURIFYING CATALYST AND PRODUCTION METHOD THEREOF

(75) Inventors: Kazuyuki Shiratori, Yokohama (JP); Katsuo Suga, Yokohama (JP); Masanori Nakamura, Yokosuka (JP); Jun Ikezawa, Yokosuka (JP)

(73) Assignees: Nissan Motor Co., Ltd., Yokohama-shi (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/295,694

(22) PCT Filed: Apr. 3, 2007

(86) PCT No.: PCT/JP2007/057452
§ 371 (c)(1),
(2), (4) Date: Oct. 21, 2008

(87) PCT Pub. No.: WO2007/119658
PCT Pub. Date: Oct. 25, 2007

(65) Prior Publication Data
US 2009/0275467 A1 Nov. 5, 2009

(30) Foreign Application Priority Data
Apr. 3, 2006 (JP) .............................. 2006-101580

(51) Int. Cl.
*B01J 23/46* (2006.01)

(52) U.S. Cl. ...................................... 502/303; 502/304
(58) Field of Classification Search ................. 502/303, 502/304
See application file for complete search history.

(56) References Cited

U.S. PATENT DOCUMENTS

| | | | | |
|---|---|---|---|---|
| 5,756,057 | A * | 5/1998 | Tsuchitani et al. | 423/213.2 |
| 6,896,857 | B2 * | 5/2005 | Nakamura et al. | 423/213.5 |
| 7,005,404 | B2 * | 2/2006 | He | 502/325 |
| 7,585,811 | B2 * | 9/2009 | Nakamura et al. | 502/327 |

FOREIGN PATENT DOCUMENTS

| | | |
|---|---|---|
| JP | 2000-246107 A | 9/2000 |
| JP | 2002-320850 A | 11/2002 |
| JP | 2004-298813 A | 10/2004 |
| JP | 2005-111336 A | 4/2005 |
| JP | 2006-035130 A | 2/2006 |

* cited by examiner

*Primary Examiner*—Timothy C Vanoy
*Assistant Examiner*—Michelle Hou
(74) *Attorney, Agent, or Firm*—Foley & Lardner LLP

(57) ABSTRACT

An exhaust gas purifying catalyst including: rhodium particles having catalytic activity; compound particles which are formed on peripheries of the rhodium particles and support the rhodium particles; and oxides which are formed on peripheries of the compound particles and suppress coagulation of the compounds.

20 Claims, 4 Drawing Sheets

(a)

(b)

(a)

(b)

(a)

(b)

(c)

EXHAUST GAS PURIFYING CATALYST AND PRODUCTION METHOD THEREOF

TECHNICAL FIELD

The present invention relates to an exhaust gas purifying catalyst that purifies exhaust gas discharged from an engine of an automobile.

BACKGROUND ART

As awareness to protect the environment has been raised, control for an amount of exhaust gas of an automobile or the like has been strengthened. Accordingly, a variety of researches to enhance performance of an exhaust gas purifying catalyst that purifies exhaust gas discharged from an engine of the automobile have been performed.

The exhaust gas purifying catalyst usually has a configuration in which microparticles of noble metal such as platinum (Pt), palladium (Pd) and rhodium (Rh) are supported on a surface of a particulate metal oxide support made of alumina ($Al_2O_3$) or the like. By a catalytic function of such noble metal particles, the exhaust gas purifying catalyst converts harmful gas, such as unburned hydrocarbon (HC), carbon monoxide (CO) and nitrogen oxide ($NO_x$), which is contained in the exhaust gas, into harmless water and gas.

Among the noble metals for use in the exhaust gas purifying catalyst, Rh is noble metal contained in the exhaust gas purifying catalyst since it is excellent in purification performance at a low temperature. With regard to the exhaust gas purifying catalyst containing Rh concerned, there is one using a Ce oxide as a compound that supports Rh (for example, Patent Document 1). This Ce oxide has an oxygen storage/release capacity, and accordingly, by being located in the vicinities of the noble metal particles, has a function as a promoter, specifically, has a function to suppress variations of the purification performance owing to variations of an atmosphere of the exhaust gas. Therefore, in the exhaust gas purifying catalyst using the Ce oxide as the compound that supports rhodium, an oxygen storage/release effect of the Ce oxide is exerted, the variations of the atmosphere in the peripheries of the noble metal particles are absorbed, and activity of the catalyst is enhanced, and eventually, the performance of the exhaust gas purifying catalyst can be enhanced.

Patent Document 1: Japanese Patent Laid-Open Publication No. 2004-298813

DISCLOSURE OF THE INVENTION

However, in a conventional exhaust gas purifying catalyst using the Ce oxide such as $CeO_2$ (ceria) for the compound that supports Rh, since this Ce oxide is brought into contact with Rh in the exhaust gas purifying catalyst, there has been a case where oxidation of Rh is accelerated, leading to a decrease of such catalyst performance.

Moreover, immediately after preparation, the noble metal particles in the exhaust gas purifying catalyst are supported while maintaining a particle diameter thereof to be as small as possible for the purpose of enhancing the performance of the exhaust gas purifying catalyst. However, there has been a case where, as the exhaust gas purifying catalyst is used, specifically, as the exhaust gas purifying catalyst is exposed into an atmosphere where high-temperature oxidation atmosphere and reduction atmosphere are alternately repeated, the adjacent noble metal particles are coagulated and united with one another to be coarsened to several ten nanometers, a surface area of the noble metal particles is decreased, and a purification rate for such harmful substances is decreased with time.

Moreover, in the catalyst that supports the particles of the noble metal such as Rh on the alumina or the Ce oxide, if coagulation of the alumina itself or the ceria itself occurs, then an interval among the noble metal particles is narrowed, and accordingly, there has been a case where, also in this point, the noble metal particles are coagulated, and the catalyst performance is decreased.

An exhaust gas purifying catalyst of the present invention, which advantageously solves the above-described problems, is summarized to be composed of: rhodium particles; compound particles which support the rhodium particles; and oxides which are formed on peripheries of the compound particles and suppress coagulation of the compound particles.

Moreover, a production method of the exhaust gas purifying catalyst according to the present invention is summarized to include the steps of: supporting rhodium particles on compound particles with an average primary particle diameter of 30 nm or less; finely dispersing the compound particles on which the rhodium particles are supported; and forming, on peripheries of the finely dispersed compound particles, oxides which suppress coagulation of the compound particles.

BEST MODE FOR CARRYING OUT THE INVENTION

A description will be made below of embodiments of an exhaust gas purifying catalyst of the present invention while using the drawings.

Figure 1:
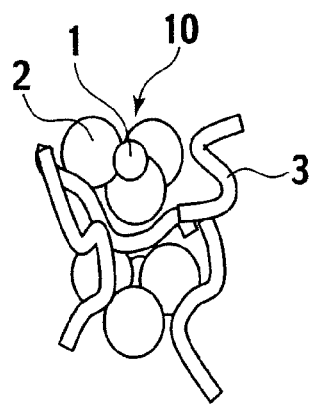
FIG. 1 is a schematic view of an example of an exhaust gas purifying catalyst according to the present invention.

FIG. 1 is a schematic view of an example of the exhaust gas purifying catalyst according to the present invention. In this drawing, the exhaust gas purifying catalyst includes: rhodium particles 1 as particles of active metal that contacts exhaust gas and purifies harmful components; compound particles 2 supporting the rhodium particles 1; and oxides 3 which are formed on peripheries of the compound particles 2 supporting the rhodium particles 1 and suppress mutual coagulation of the compound particles 2.

The compound particles 2 supporting the rhodium particles 1 are composed of a stable compound that does not transfer active oxygen with the rhodium particles 1 or form a compound therewith and can suppress solid solution of the rhodium particles 1. For example, the compound particles 2 are a Zr oxide, and an oxide containing Al or Ce as a main component like a conventional exhaust gas purifying catalyst is not used. The compound particles 2 are the compound that does not transfer the active oxygen with the rhodium particles 1 or form the compound therewith, whereby primary particles of the compound particles 2 surround peripheries of the rhodium particles 1, become clusters 10, and play a role to inhibit mutual contact of the rhodium particles 1. From this fact, the compound particles 2 can suppress coagulation of the rhodium particles 1, and can maintain excellent catalytic activity even after the exhaust gas purifying catalyst is used at a high temperature for a long time.

However, if the rhodium particles 1 are merely supported by the compound particles 2 which do not transfer the active oxygen therewith or form the compounds therewith, then the compound particles 2 are coagulated and coarsened by being exposed to heat and high-temperature steam under a condition of engine exhaust gas. As being coagulated and coarsened, the compound particles 2 concerned completely coat the peripheries of the rhodium particles 1, and the rhodium particles 1 turn to a state of being incapable of contacting the engine exhaust gas, and accordingly, the catalytic activity has been sometimes decreased. In this connection, in the exhaust gas purifying catalyst according to the present invention, the oxides 3 are formed on the peripheries of the compound particles 2 supporting the rhodium particles 1. The oxides 3 are appropriately arranged on the peripheries of the compound particles 2, whereby the coagulation of the rhodium particles 1 and the compound particles 2 is suppressed, the compound particles 2 are suppressed from being coagulated and coating the peripheries of the rhodium particles 1 after the exhaust gas purifying catalyst is used at a high temperature for a longtime, and hence, exhaust gas purification performance is avoided being decreased because the engine exhaust gas and the rhodium particles 1 cannot contact each other.

Specifically, the exhaust gas purifying catalyst according to the present invention has a configuration composed of: the rhodium particles 1; the compound particles 2 which are present on the peripheries of the rhodium particles 1 and have a function to suppress the mutual coagulation of the rhodium particles 1 concerned; and the oxides 3 which are present on the peripheries of the rhodium particles 1 and the compound particles 2 and suppress the coagulation of the rhodium particles 1 and the compound particles 2 owing to the mutual contact of the compound particles 2 concerned. In such a way, the coagulation of the rhodium particles 2 is suppressed, and in addition, the coagulation of the compound particles 2 present on the peripheries of the rhodium particles 1 is suppressed. Therefore, there is obtained an exhaust gas purifying catalyst having excellent characteristics, in which the decrease of the catalyst performance is small ever after the exhaust gas purifying catalyst is used at a high temperature for a long time.

Moreover, in the exhaust gas purifying catalyst according to the present invention, the clusters 10 are formed, on which the rhodium particles 1 are supported, and in which several to several hundreds of the primary particles of the compound particles 2 gather. Peripheries of the clusters 10 are surrounded by the oxides 3, whereby mutual coagulation of the clusters 10 is suppressed, and gas diffusibility is prevented from being impaired because the rhodium particles 1 are completely coated with the compound particles 2.

Note that, as will be described later in detail, the oxides 3 contain, for example, an Al oxide or a Ti oxide as a main component. Such Al oxide or Ti oxide is porous, and has a relatively large number of pores in insides of primary particles thereof in comparison with the compound particles 2. Therefore, even if the clusters 10 are surrounded by the oxides 3, the exhaust gas can contact the rhodium particles 1 through the pores, and hence, the gas diffusibility is not impaired, and it is possible for the exhaust gas to transmit through gaps among the oxides 3 and the clusters 10.

With regard to a diameter of the clusters 10 of the compound particles 2, it is desirable that the clusters 10 with a diameter of 200 nm or less be contained in the exhaust gas purifying catalyst. This is because, in the case where the diameter of the clusters exceeds 200 nm, the peripheries of the rhodium particles 1 are coated with the compounds 2, and diffusion of the exhaust gas onto Rh is significantly inhibited. It is more desirable that the diameter of the clusters 10 of the compound particles 2 be 100 nm or less. This is because, if the diameter of the clusters 10 is 100 nm or less, then the number of compound particles 2 on the peripheries of the rhodium particles 1 is remarkably reduced, a contact capability of the rhodium particles 1 with the exhaust gas is enhanced, and the catalytic activity is enhanced.

Figure 2:
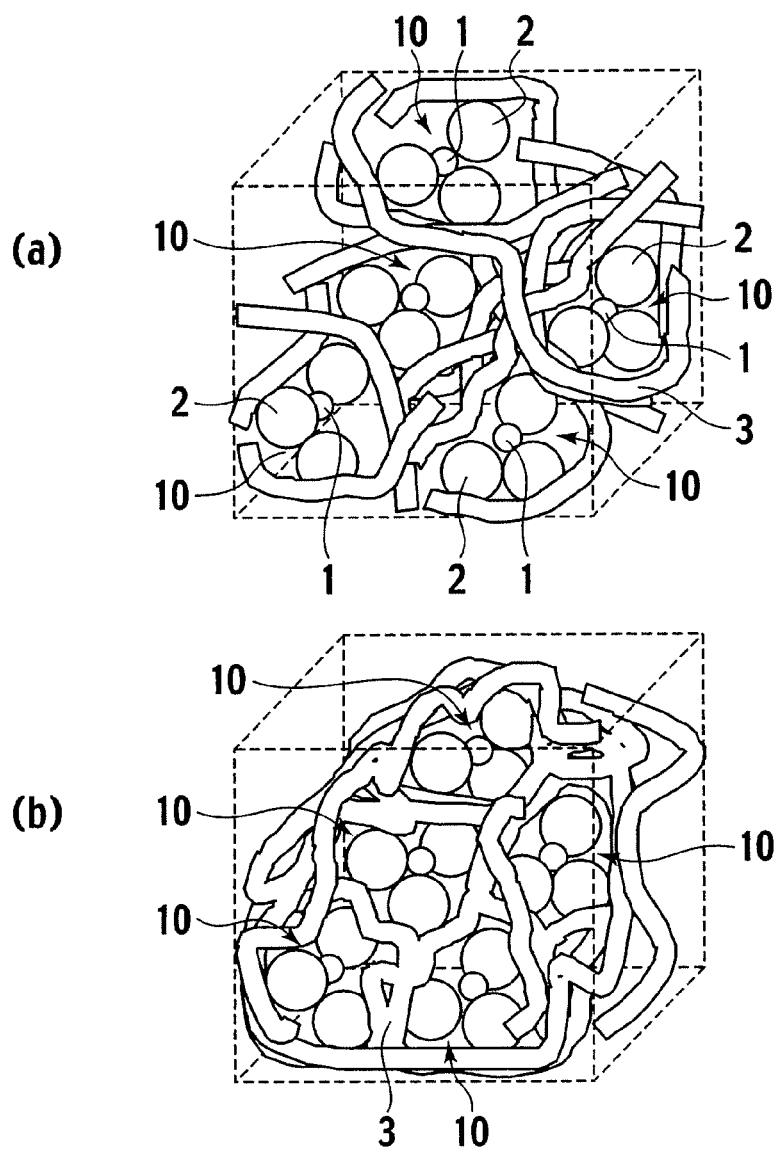
FIG. 2 is a schematic view showing a chronological change of the exhaust gas purifying catalyst according to the present invention.

FIG. 2 is a view chemically showing structures of the exhaust gas purifying catalyst in an initial state (FIG. 2(a)) and a state after the exhaust gas purifying catalyst is used at a high temperature for a long time (FIG. 2(b)). In the exhaust gas purifying catalyst according to the present invention, the compound particles 2 surround the peripheries of the rhodium particles 1, whereby the mutual contact of the rhodium particles 1 is inhibited. In addition, the oxides 3 are formed on the peripheries of the clusters 10 of the rhodium particles 1 concerned and the compound particles 2, whereby the coagulation of the compound particles 2 is suppressed, and eventually, the mutual contact and coagulation of the clusters 10 are prevented. Accordingly, in comparison between FIG. 2(a) illustrating the initial state and FIG. 2(b) illustrating the state after the exhaust gas purifying catalyst is used at a high temperature for a long time, a chronological change of the structure of the exhaust gas purifying catalyst is small, and excellent exhaust gas purification performance can be maintained for a long time.

Figure 3:
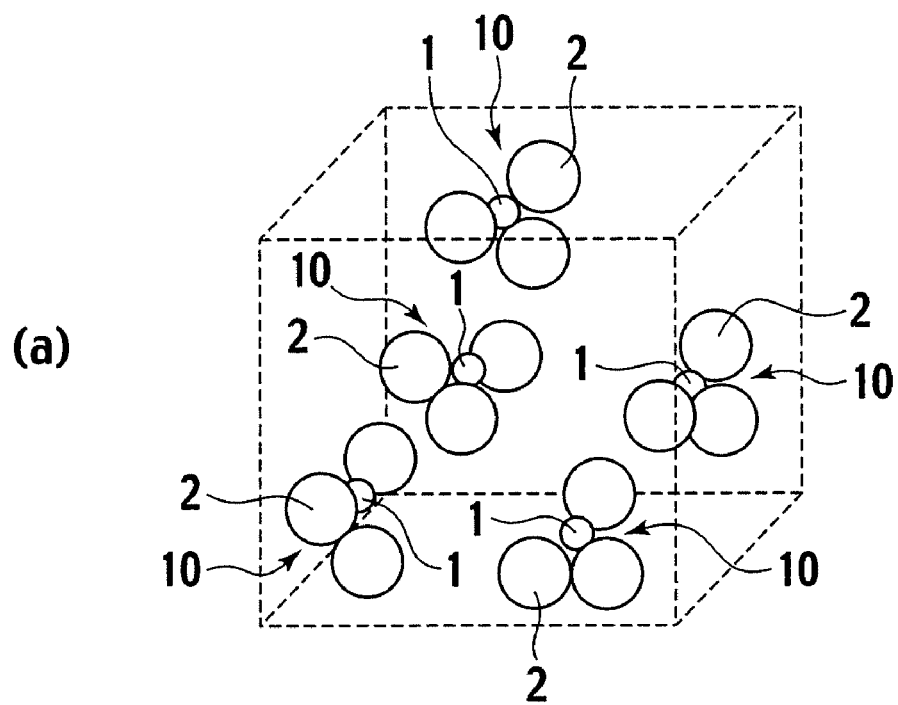
FIG. 3 is a schematic view showing a chronological change of a conventional exhaust gas purifying catalyst.
Figure 3:
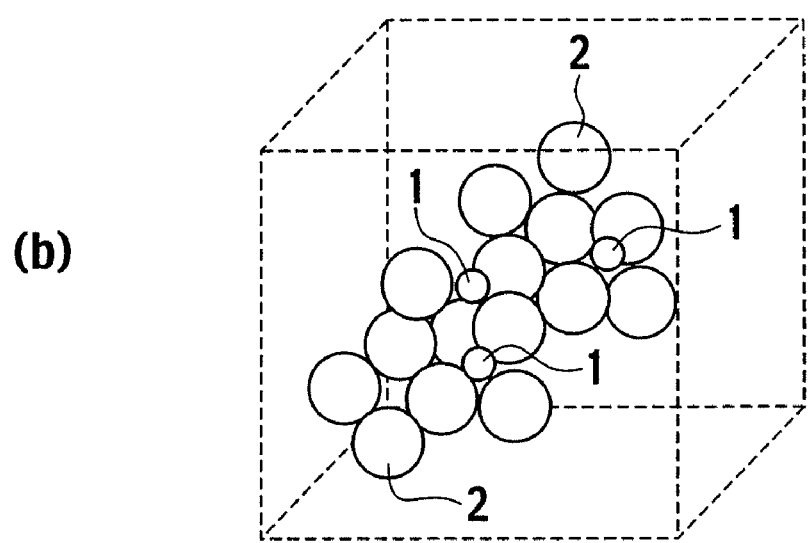

For comparison, with regard to an exhaust gas purifying catalyst that does not include the oxides 3, FIGS. 3(a) and 3(b) schematically show structures thereof in an initial state (FIG. 3(a)) and a state after the exhaust gas purifying catalyst concerned is used at a high temperature for a long time (FIG. 3(b)). In the exhaust gas purifying catalyst that does not include the oxides 3, in the initial state (FIG. 3(a)), the rhodium particles 1 supported on the compound particles 2 are surrounded by the plurality of compound particles 2, whereby primary pores (pore diameter: 10 to 20 nm) are formed on the peripheries of the rhodium particles 1. In addition, secondary pores (pore diameter: 50 to 100 nm) as gaps among the clusters 10 of the rhodium particles 1 and the compound particles 2 are formed. Hence, the exhaust gas can sufficiently contact the rhodium particles 1, and the catalytic activity of the rhodium can be exerted sufficiently. However, in the state after the exhaust gas purifying catalyst is used at a high temperature for a long time (FIG. 3(b)), the clusters 10 of the rhodium particles 1 and the compound particles 2 are coagulated with one another, and accordingly, the rhodium particles 1 are coarsened, and in addition, the primary pores and the secondary pores on the peripheries of the rhodium particles 1 thus coarsened are reduced, whereby the exhaust gas cannot sufficiently contact the rhodium particles 1. Therefore, the catalytic activity of the rhodium particles 1 is decreased. Based on comparison between FIGS. 3(a) and 3(b) and FIGS. 2(a) and 2(b), such an effect of the exhaust gas purifying catalyst according to the present invention can be understood easily.

It is preferable that an average primary particle diameter of the compound particles 2 be 5 to 30 nm. Reasons for this are as follows. If the average primary particle diameter does not reach 5 nm, then the compound particles 2 do not act as physical barriers which suppress sintering of the rhodium particles 1 since the compound particles 2 are relatively small in comparison with the rhodium particles 1. Meanwhile, if the average primary particle diameter exceeds 30 nm, then a specific surface area of the compound particles 2 is decreased.

It is preferable that an average particle diameter of the rhodium particles 1 be 2 to 10 nm. Reasons for this are as follows. If the average particle diameter of the rhodium particles does not reach 2 nm, then a radical drop of a melting point thereof occurs, and the sintering of the rhodium particles 1 becomes prone to occur. Meanwhile, if the average particle diameter exceeds 10 nm, then an active surface area per unit weight is significantly decreased, and sufficient catalytic activity cannot be obtained, and accordingly, it is necessary to use a larger amount of the rhodium particles in the catalyst in order to allow the catalyst concerned to exert intended performance for purifying the exhaust gas of the automobile.

It is desirable that 80% or more of the rhodium particles exist on the compound particles 2. Although depending on a production method, the rhodium particles 1 do not only exist on the compound particles 2 but also sometimes exist on the oxides 3. However, in such a case where the rhodium particles exist on the oxides 3, the rhodium particles 1 are easily oxidized since the rhodium particles 1 transfer the active oxygen with the compounds 3, generate a composite oxide therewith, and so on, and as a result, the rhodium particles become rhodium particles in a highly oxidized state with low activity. Accordingly, if 80% or more of the rhodium particles exists on the compound particles 2, then it is possible to maintain Rh in a metal state with high activity or maintain a state of $Rh_2O_3$ since the active oxygen is not transferred between the compound particles 2 and the rhodium particles 1, or the composite oxide is not generated from both thereof. Note that it is possible to specify, by a TEM measurement, such a state where the rhodium particles 1 exist. More specifically, a sample containing the catalyst according to the present invention is processed into an extremely thin slice by microtome processing, and the extremely thin slice is subjected to the TEM measurement, whereby a state of the peripheries of Rh is observed, thus making it possible to determine materials on which Rh is supported. Moreover, the peripheries of Rh are subjected to EDX point analysis, thus making it possible to specify elements contained in the sample.

It is desirable that a main component of the compound particles 2 be an oxide containing Zr. The main component mentioned here refers to that Zr is contained by 50 mol % or more. Rh has low reactivity with Zr, where such transfer of the active oxygen and such creation of the composite oxide are less likely to occur. Accordingly, the oxide containing Zr is applied to the compound particles 2, and the rhodium particles 1 are supported thereon, whereby an influence is hardly given to an electron state of Rh, and Rh can be maintained in the active metal state or the state of $Rh_2O_3$. As other components, for example, oxides of La, Ce, Nd, Y and the like can be contained.

It is desirable that the oxides 3 contain either of Al and Ti as a main component. In both of the oxide of Al and the oxide of Ti, heat resistance thereof is high, and there is hardly any reaction or solid solution with the Zr oxide as the main component of the compound particles 2. Accordingly, even after exhaust gas purification treatment at a high temperature for a long time, the structure of the exhaust gas purifying catalyst of the present invention can be maintained. In particular, it is preferable that Al be contained as the main component. Reasons for this are as follows. Even under an exhaust gas endurance atmosphere, $Al_2O_3$ has high heat resistance, in particular, has high durability against the high-temperature steam, and has a large specific surface area even after the endurance, and accordingly, $Al_2O_3$ is suitable as the material that suppresses the mutual coagulation of the clusters. Moreover, with regard to a form of $Al_2O_3$, $Al_2O_3$ exists as single particles in such a form of $\gamma$-$Al_2O_3$, and accordingly, is less likely to be coagulated and to grow, and further, is likely to enter the gaps among the clusters 10 at the time of being formed from a precursor. In the oxides 3, for example, oxides of La, Ce, Zr, Nd, Y and the like can be contained as other components. Note that the oxides 3 are not limited to ones having a fiber shape as shown in FIG. 1 or ones having a needle shape. For example, the oxides 3 may be spherical ones or ones with a thin slice shape.

It is desirable that, in the compound particles 2, La be contained in addition to Zr. Although $ZrO_2$ may be solely contained in the compound particles 2, $ZrO_2$ solely contained therein is prone to take a monoclinic system in which crystal growth is fast upon receiving heat, and a specific surface area thereof tends to be significantly decreased. Accordingly, elements such as La, Ce, Nd and Y are doped into the compound particles 2, whereby the monoclinic system is shifted to a stable tetragonal or cubic system, thus making it possible to enhance durability of the compound particles 2. In particular, with regard to La, an influence thereof to the electron state of Rh is small, and a negative influence thereof to the catalyst performance is small, and accordingly, La is a desirable element. It is recommended that a doped amount of La be approximately 1 to 10%, preferably, approximately 1 to 7% in conversion to mol %. When the doped amount of La is increased, though a crystal phase of the compound particles 2 is stabilized, the decrease of the specific surface area becomes prone to occur under the exhaust gas endurance atmosphere. Although detailed reasons for this are unknown, this is considered to be because La—O bonding is more prone to be cut off by $H_2O$ radicals than Zr—O bonding, and the crystal growth is thereby accelerated. Hence, it is preferable that the doped amount be set within the above-described numeric range.

With regard to amounts of the compound particles 2 and the oxides 3, a saturation molar ratio of the compound particles 2 and the oxides 3 in catalyst powder is defined by a saturation capacity ratio obtained by the following expression:

$$\text{Saturation capacity ratio} = (\text{oxide capacity } [m^3/g] \times 47) / (\text{compound capacity } [m^3/g] \times 53)$$

In this case, when the saturation molar ratio is 1 or more, it is preferable that a molar ratio of the oxides and the compounds be 2 or less. In accordance with a research of the inventors, the following has been found out. Specifically, when the amount of the oxides 3 is excessively large with respect to that of the compound particles 2 supporting the rhodium particles 1, the oxides 3 come to exist excessively with respect to the surface area of the clusters of the compound particles 2, leading to an apprehension that the rhodium particles 1 may turn to the highly oxidized state with low activity, and the catalyst performance may be decreased. As a result of further progressing the research, it has been found out that the catalyst satisfies a suitable condition regarding the relationship between the compound particles 2 and the oxides 3, which is represented by the above-described saturation molar ratio, thus making it possible to enhance the catalyst performance.

Figure 4:
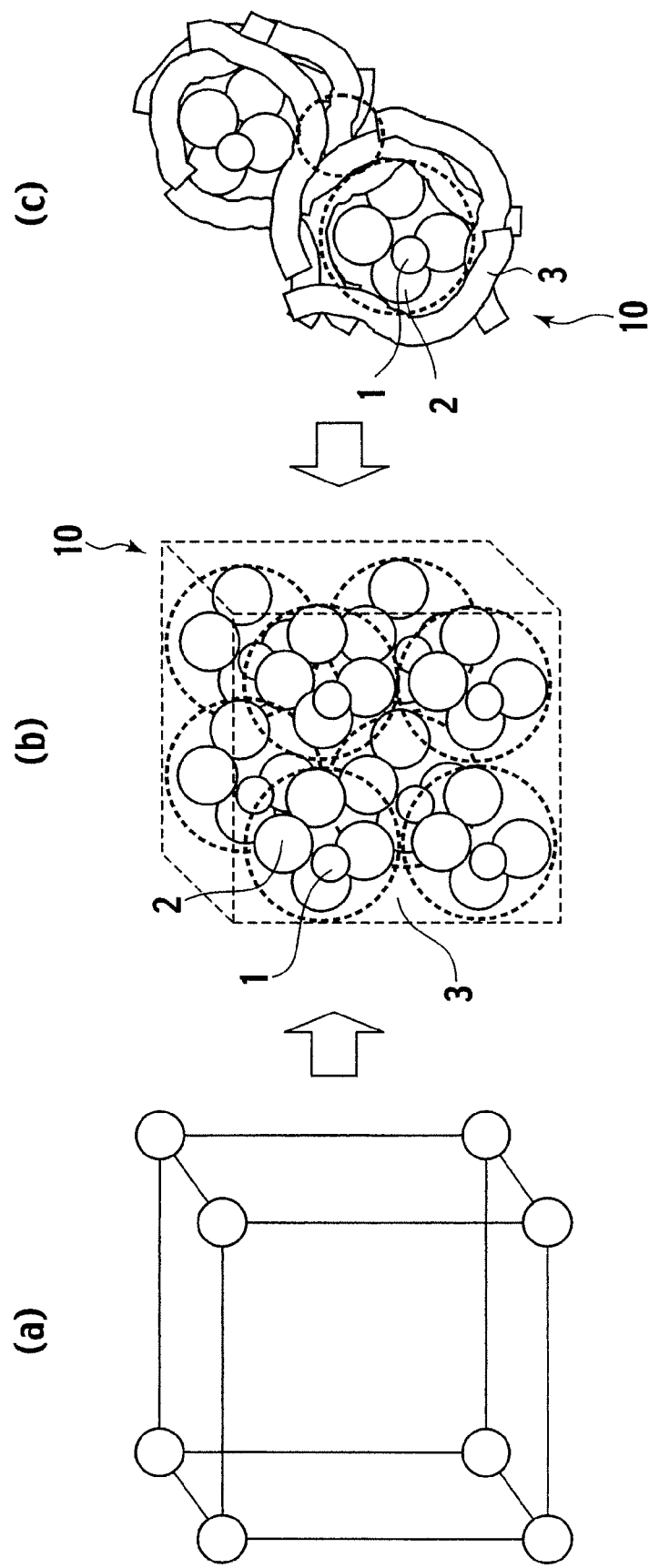
FIG. 4 is a schematic view explaining a concept of a saturation molar ratio.

This saturation molar ratio is an index indicating to which extent the clusters of the compound particles 2 are coated with the oxides 3 in the catalyst powder. With regard to the actual catalyst shown in FIG. 4(c), in the arrangement of the compound particles 2 and the oxides 3, it is assumed that all the clusters of the compound particles 2 are spheres with the same radius in the catalyst powder, that the compounds 2 are arranged as a simple cubic lattice as shown in FIG. 4(a), and that the oxides 3 exist in gaps among the compound particles 2 (FIG. 4(b)). In this case, a volume occupied by the clusters of the compound particles 2 in the catalyst powder (that is, a compound cluster capacity) is 53 [vol %] in theory. In the case where it is considered that the volume of the rhodium particles 1 is ignorable since it is relatively small, in a similar way, a volume occupied by the oxides 3 in the catalyst powder (that is, an oxide capacity) is 47 [vol %] equivalent to the gaps among the compounds 2 arranged as the simple cubic lattice, that is, the rest obtained by subtracting 53 [vol %] as a volume percent of the compound cluster capacity from 100 [vol %] as a volume percent of the entire powder capacity.

The actual compound capacity and oxide capacity of the catalyst can be individually measured. The compound capacity can be calculated by the following expression:

Compound capacity [m$^3$/g]={1/compound density [g/m$^3$]+compound pore capacity [m$^3$/g]}×compound ratio [wt %] in catalyst÷100

Moreover, the oxide capacity can be calculated by the following expression:

Oxide capacity [m$^3$/g]={1/oxide density [g/m$^3$]+oxide pore capacity [m$^3$/g]}×oxide ratio [wt %] in catalyst÷100

The compound and oxide densities are determined by substances thereof. Moreover, the compound and oxide pore capacities can be individually measured form the actual catalyst by a gas adsorption method. Moreover, the compound and oxide ratios are determined by loadings thereof at the time of producing the catalyst.

Figure 5:
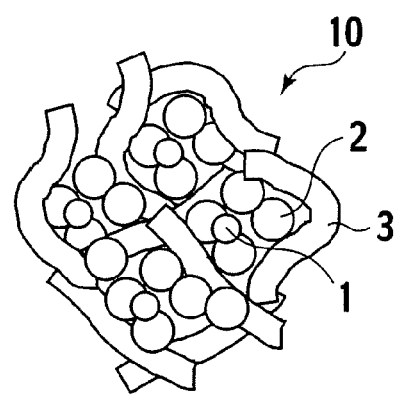
FIG. 5 is a schematic view showing a difference among structures owing to a difference in saturation molar ratio.
Figure 5:
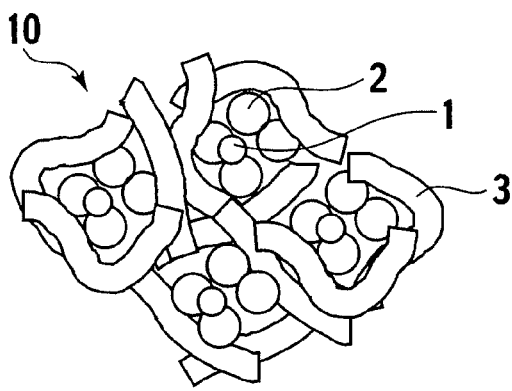
Figure 5:
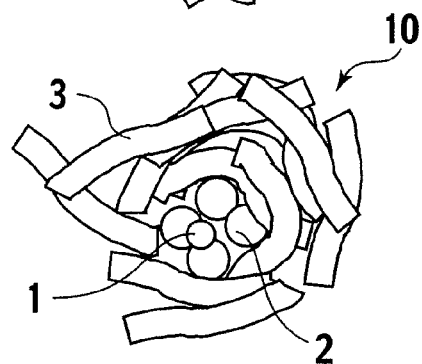

Hence, the compound capacity of the actual catalyst and the oxide capacity thereof are individually measured, and the saturation capacity ratio is calculated in accordance with the above-described expressions. It is considered that, in the case where the saturation capacity ratio exceeds 1, a state is brought, where entire surfaces of the clusters of the compounds 2 are coated with the oxides 3. On the contrary, it is considered that, in the case where the saturation capacity ratio is less than 1, a state is brought, where a part of the clusters of the compounds 2 is not coated with the oxides 3, and the clusters of the compounds 2 contact each other. FIG. 5(a) to (c) schematically show the above-described states: FIG. 5(a) shows the case where the saturation capacity ratio falls down below 1; FIG. 5(b) shows the case where the saturation capacity ratio is approximately 1; and FIG. 5(c) shows the case where the saturation capacity ratio exceeds above 1.

The state of the rhodium particles 1 differs between the case where the saturation capacity ratio is 1 or more and the case where the saturation capacity ratio is less than 1. Specifically, in the case where the saturation capacity ratio is 1 or more, the state is brought, where all the clusters of the compounds 2 are coated with the oxides 3, and the gas diffusibility on the peripheries of the rhodium particles 1 is ensured. However, if the amount of the oxides 3 is too large (FIG. 5(c)), then the rhodium particles 1 are fixed in the highly oxidized state with the low activity owing to an interaction between the rhodium particles 1 and the oxides 3, leading to an apprehension that the catalytic activity may be decreased. This state is relatively determined by the molar ratio of the oxides/compounds. When the molar ratio of the oxides and the compounds exceeds 2, the catalytic activity is decreased to an extreme. Hence, in the catalyst of the present invention, it is preferable that the molar ratio of the oxides and the compounds be 2 or less in the case where the saturation molar ratio is 1 or more.

In particular, in the case where the saturation capacity ratio is approximately 1, such an action to suppress the coagulation of the clusters of the compounds 2 by the oxides 3 and such an action to ensure the gas diffusibility on the peripheries of the rhodium particles 1 are balanced as appropriate.

Meanwhile, in the case where the saturation capacity ratio is less than 1, it is rare that the rhodium particles 1 turn to the highly oxidized state since the amount of the oxides 3 is relatively small; however, the surfaces of the clusters of the compounds 2 cannot be sufficiently coated with the oxides 3. Accordingly, an effect of suppressing the mutual thermal coagulation of the clusters of the compounds 3 is reduced, the peripheries of the rhodium particles 1 are coated with the coagulated compound particles 2 after the endurance, and it becomes difficult to sufficiently ensure the gas diffusibility on the peripheries of the rhodium particles 1 (FIG. 5(a)). In this state, as the surface area of the clusters of the compounds 2 is relatively larger, the rhodium particles 1 are less likely to be affected by the thermal coagulation. Specifically, it is more preferable that the surface area of the clusters of the compounds in the catalyst powder be 3.0 [m$^2$/g] or more. The surface area of the clusters of the compound particles 2 is obtained by the following expression:

Compound cluster surface area [m$^2$/g]=(compound cluster radius)$^2$×(number of clusters per 1 g of catalyst)×(compound ratio [%] in catalyst)÷100

It is more preferable that La be contained in the compounds 2, and that a content of La be 1 to 5 mol %. In general, when a doped amount of La is increased, the crystal phase is shifted from the $ZrO_2$ monoclinic system to the tetragonal or cubic system, and is oriented to be stabilized against the crystal growth caused by the heat endurance. However, the decrease of the specific surface area becomes prone to occur under the exhaust gas endurance atmosphere where a large amount of steam is contained and a rich atmosphere and a lean atmosphere are frequently repeated. Although detailed reasons for this are unknown, this is considered to be because the La—O bonding is more prone to be cut off by the $H_2O$ radicals than the Zr—O bonding, and the crystal growth is thereby accelerated.

Hence, the optimum doped amount of La has an optimum value. When the doped amount of La is 1 mol % or less, sufficient crystal stabilization by the doping cannot be obtained. On the contrary, when the doped amount of La is 5 mol % or more, the heat resistance of the compounds 2 is decreased because of the above-described reasons, and the thermal coagulation of Rh supported thereon is accelerated, and accordingly, the catalyst performance is decreased.

It is preferable that the element to be doped be only La; however, elements such as Nd, Pr and Ce can be added in a similar way for the purpose of enhancing the heat resistance. However, as described above, it is preferable that a total content of the elements to be doped be 1 to 5 mol %.

It is possible to measure the contents of these elements by the point analysis using the TEM-EDX, and so on.

Next, a production method of the exhaust gas purifying catalyst according to the present invention includes the following steps in a production process, whereby the catalyst having high catalyst performance even after the endurance can be obtained.

In one production method, first, the Rh particles are supported on the compound particles with an average primary particle diameter of 30 nm or less. A supporting method is not particularly limited, and for example, an impregnation method, a spray method and the like can be used. Moreover, a catalyst raw material can also be used, in which a part of Rh is included in the compounds in the following manner. Specifically, first, Rh precursor salt or Rh colloid is mixed with compound precursor salt in an aqueous solution and the like, and thereafter, the compound precursor salt is insolubilized, and is then fired after a solvent is removed therefrom.

Subsequently, the compounds, which are obtained in the above-described step and has Rh supported thereon, are milled or dispersed, and are thereby converted into colloid or sol. As a method of the milling or the dispersion, ultrasonic milling, wet milling, dry milling and the like can be used as appropriate. Also as a method of forming the colloid or the sol, such a method of mixing the compounds with a polymeric protection material can be used as appropriate.

By including the above-described steps, the compounds on which Rh is supported become aggregates of fine secondary particles with an average particle diameter of several ten nanometers to several hundred nanometers, and the aggregates are included as fine units in the case of being included with the oxides in the subsequent step, and accordingly, the mutual coagulation of the compounds after the endurance is small, whereby the catalyst with high activity can be obtained.

Thereafter, the colloid or the sol is mixed with the oxides or the precursor of the oxides in a liquid, and a resultant is dried, and is further sintered, whereby exhaust gas purifying catalyst powder is obtained, in which the oxides are formed on the peripheries of the compound particles on which the rhodium particles are supported.

This powder is slurried, and is applied on a honeycomb support, followed by drying and firing, and is thereby used as the exhaust gas purifying catalyst.

In another production method, first, Rh salt that becomes the rhodium particles is dispersed into and supported on an oxide sol solution that becomes the compound particles and has an average primary particle diameter of 30 nm or less. In such a way, it is possible to form units having a secondary particle diameter as fine as approximately several ten nanometers. As such oxide sol for use, a nitric acid medium, an acetic acid medium and the like can be used as appropriate. Moreover, it is also possible to use colloid coated with the polymeric protection material and the like.

By including the above-described steps, the compounds A are included as fine units in the case of being included with the oxides B in the subsequent step, and accordingly, the mutual coagulation of the compounds A after the endurance is small, whereby the catalyst with high activity can be obtained.

After the above-described steps, in a similar way to the above-mentioned method, the units are mixed with the oxides or the precursor of the oxides in a liquid, and a resultant is dried and is further sintered, whereby exhaust gas purifying catalyst powder is obtained, in which the oxides are formed on the peripheries of the compound particles on which the rhodium particles are supported.

Figure 6:
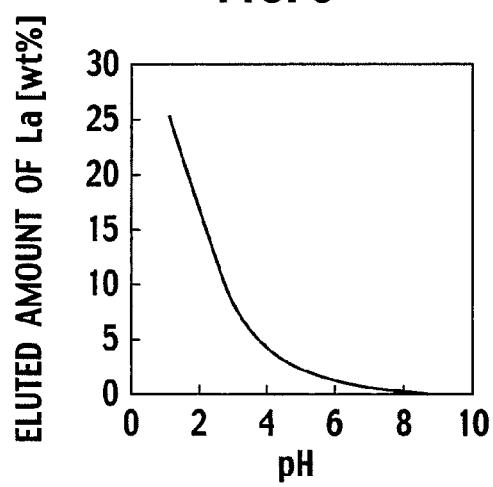
FIG. 6 is a graph showing a relationship between pH and an eluted amount of La.

It is preferable that a rhodium solution used in order to support the rhodium particles on the compound particles be a solution containing at least either of carboxylic acid salt and ammine complex salt. It is preferable that La be added into the compounds 2 in addition to Zr; however, in an acidic solution, La as an alkaline element is easily eluted into the solvent. FIG. 6 is a graph showing a relationship between pH and an eluted amount of La. As shown in FIG. 6, the eluted amount of La is increased in a quadratic curve as pH is decreased, an inflection point is approximately 2 to 3 or less, and such elusion is hardly seen when pH is 4.5 or more. For example, in the rhodium supporting step, pH is small in a solution of strong acid salt such as rhodium nitrate, and accordingly, La in the compounds is eluted, and in the drying step, La is adsorbed to the surfaces of the compounds together with rhodium salt. Accordingly, La originally doped into the compounds is precipitated as an oxide onto the surfaces of the compounds, the heat resistance of the compounds is significantly decreased, and the movement and burying of the supported rhodium particles are accelerated by the coagulation of the compounds, causing a case where the catalyst performance is decreased.

In this connection, as the rhodium solution used in order to support the rhodium particles on the compound particles, it is preferable to use the solution containing at least either of the carboxylic acid salt and the ammine complex salt. Such weak acid to alkaline rhodium precursor salt is used, whereby not only the elution of La by the above-described decrease of pH can be suppressed, but also it is possible to uniformly support the rhodium salt on the compounds since the weak acid to alkaline rhodium precursor salt generally has a slow adsorption speed onto the compounds in comparison with strong acid salt such as nitrate and sulfate.

For a specific rhodium precursor, it is possible to appropriately use acetic acid having carboxylic acid on an end thereof, oxalic acid, fumaric acid, maleate, and triamine, tetraamine, hexaamine hydroxyl salt and the like, which are the ammine complex salts.

This powder is slurried, is applied on the honeycomb support, followed by drying and firing, and is thereby used as the exhaust gas purifying catalyst.

EXAMPLES

The respective exhaust gas purifying catalysts of Examples 1 to 6 and Comparative examples 1 and 2, which are shown in Table 1, were created. Each of these exhaust gas purifying catalysts was formed into a two-layer structure in which the catalysts were applied on a honeycomb-like ceramic base material, and is shown in Table 1 while defining a layer close to the honeycomb base material as an inner layer, and defining a layer close to the surface as a surface layer.

[Table 1]

TABLE 1

| | | Configuration of catalyst surface layer | | | | | After endurance | | |
| --- | --- | --- | --- | --- | --- | --- | --- | --- | --- |
| | Noble | Compound A (mol %) | | Oxide B (mol %) | | Coated | Rh particle | Particle diameter of | |
| | metal [g/L] | Main component | Sub component | Main component | Sub component | amount [g/L] | diameter [nm] | compound A [nm] | HC-T50 [° C.] |
| Example 1 | Rh-0.3 | Zr | — | Al | — | 100 | 5.5 | 28 | 340 |
| Example 2 | Rh-0.3 | Zr | La(2) | Al | La(1) | 100 | 4.5 | 25 | 330 |
| Example 3 | Rh-0.1 | Zr | La(2), Ce(13) | Al | La(1) | 100 | 4.3 | 25 | 338 |
| Example 4 | Rh-0.1 | Zr | Nd(3) | Al | La(1), Ce(7) | 100 | 5 | 27 | 335 |
| Example 5 | Rh-0.3 | Zr | Y(5) | Al | Zr(3) | 100 | 6 | 25 | 330 |
| Example 6 | Rh-0.3 | Zr | — | Ti | — | 100 | 8 | 30 | 335 |
| Comparative example 1 | Rh-1.0 | — | — | Al | Zr(3) | 100 | 40 | — | 340 |
| Comparative example 2 | Rh-0.5 | Zr | La(2) | — | — | 100 | 11 | 35 | 370 |

Moreover, the respective exhaust gas purifying catalysts of Examples 7 to 12, which are shown in Table 2, were created. Each of these exhaust gas purifying catalysts was formed into a two-layer structure in which the catalysts were applied on a honeycomb-like ceramic base material, and is shown in Table while defining a layer close to the honeycomb base material as an inner layer, and defining a layer close to the surface as a surface layer.

[Table 2]

The respective exhaust gas purifying catalysts were created by the steps to be mentioned below.

1. Preparation of Surface-Layer Catalyst Powder

Example 1

An acidic solution of rhodium nitrate (Rh concentration: 8.1 wt %) was dispersed into commercially available zirconium oxide sol (primary particle diameter: 15 nm), and was

TABLE 2

| | | Configuration of catalyst surface layer | | | | | | | After endurance | | |
|---|---|---|---|---|---|---|---|---|---|---|---|
| | | Compound A (mol %) | | Oxide B (mol %) | | | | | Surface | | Particle |
| | | | | | | | Molar ratio | area of | Rh | diameter | |
| | Noble metal [g/L] | Main component | Sub component | Main component | Sub component | Coated amount [g/L] | Saturation molar ratio | of oxide B to compound A | compound cluster A [m²/g] | particle diameter [nm] | of compound A [nm] | HC-T50 [° C.] |
| Example 7 | Rh-0.1 | Zr | La(1) | Al | — | 100 | 2.2 | 1.43 | 8.8 | 5.5 | 28 | 340 |
| Example 8 | Rh-0.1 | Zr | La(2) | Al | La(1) | 100 | 1 | 0.55 | 13.2 | 5.3 | 25 | 335 |
| Example 9 | Rh-0.1 | Zr | La(2) | Al | La(1) | 100 | 0.4 | 0.24 | 17.6 | 5.8 | 25 | 340 |
| Example 10 | Rh-0.3 | Zr | La(2) | Al | La(1), Ce(7) | 100 | 0.5 | 0.28 | 15.8 | 6.5 | 30 | 330 |
| Example 11 | Rh-0.3 | Zr | La(5) | Al | — | 100 | 0.37 | 0.24 | 1 | 11 | 25 | 360 |
| Example 12 | Rh-0.3 | Zr | La(10) | Al | — | 100 | 5.97 | 5.07 | 4.4 | 6 | 30 | 365 |

Furthermore, the respective exhaust gas purifying catalysts of Examples 13 to 16 and Comparative example 3, which are shown in Table 3, were created. Each of these exhaust gas purifying catalysts was formed into a two-layer structure in which the catalysts were applied on a honeycomb-like ceramic base material, and is shown in Table 3 while defining a layer close to the honeycomb base material as an inner layer, and defining a layer close to the surface as a surface layer.

[Table 3]

stirred by a magnetic stirrer for approximately two hours. Meanwhile, a solution was created, in which aluminum isopropoxide was mixed into hexylene glycol, and was dissolved thereinto in an oil bath of 120° C. Into this hexylene glycol solution of the aluminum isopropoxide, such a mixture of the rhodium and the zirconium oxide sol, which was previously obtained as above, was slowly dropped in an oil bath of 80° C. In such away, aluminum hydroxide was formed on peripheries of the rhodium and the zirconium oxide.

TABLE 3

| | | Configuration of catalyst surface layer | | | | | After endurance | | |
|---|---|---|---|---|---|---|---|---|---|
| | | Compound A (mol %) | | Oxide B (mol %) | | | Rh | Particle diameter | |
| | Noble metal [g/L] | Main component | Sub component | Main component | Sub component | Coated amount [g/L] | particle diameter [nm] | of compound A [nm] | HC-T50 [° C.] |
| Example 13 | Rh-0.1 | Zr | La(1) | Al | — | 100 | 4.5 | 25 | 325 |
| Example 14 | Rh-0.2 | Zr | La(5) | Al | La(1) | 100 | 4.7 | 27 | 330 |
| Example 15 | Rh-0.3 | Zr | La(1) | Al | La(1) | 100 | 4.6 | 22 | 315 |
| Example 16 | Rh-0.3 | Zr | La(3) | Al | La(1), Ce(7) | 100 | 5 | 30 | 313 |
| Comparative example 3 | Rh-0.3 | Zr | La(10) | — | — | 100 | 12 | 55 | 365 |

Thereafter, a temperature of the oil bath was gradually raised while stirring the solution under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which zirconium oxide particles existed on the peripheries of the Rh particles, and were further coated with alumina.

Example 2

An acidic solution of rhodium nitrate (Rh concentration: 8.1 wt %) and lanthanum nitrate 6-hydrate were dispersed into commercially available zirconium oxide sol (primary particle diameter: 15 nm), and were stirred by a magnetic stirrer for approximately two hours. Meanwhile, a solution was created, in which aluminum isopropoxide and lanthanum isopropoxide were mixed into hexylene glycol, and were dissolved thereinto in an oil bath of 120° C. Into this hexylene glycol solution of the aluminum isopropoxide and the lanthanum isopropoxide, such a mixture of the rhodium and the zirconium oxide sol, which was previously obtained as above, was slowly dropped in an oil bath of 80° C. In such a way, aluminum hydroxide was formed on peripheries of the rhodium and the zirconium oxide. Thereafter, a temperature of the oil bath was gradually raised while stirring the solution under a reduced pressure, whereby the solvent was evaporated.

Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with lanthanum-alumina.

Example 3

In pure water, PVP-Rh colloid (made by Tanaka Kikinzoku Kogyo K.K.; Rh concentration: 2.0 wt %) and commercially available composite compound powder of zirconium oxide-lanthanum oxide-cerium oxide (primary particle diameter: 15 nm) were dispersed, and stirred by a magnetic stirrer for approximately two hours. Next, the solvent was removed, and a resultant was dried at 150° C. for 12 hours, and was thereafter fired at 400° C. Powder thus obtained was wet-milled by a ball mill. To slurry taken out of the ball mill, polyvinylpyrrolidone (average molecular weight: 8000) was added, and a mixture was heavily stirred, whereby colloid was obtained. No sedimentation was observed in this colloid even after the colloid was left day and night. This colloid was mixed with a solution in which boehmite (primary particle diameter: 40 nm) and lanthanum nitrate 6-hydrate were dispersed into pure water, and a temperature of a solution thus obtained was gradually raised in an oil bath while stirring the solution under a reduced pressure, whereby the solvent was evaporated.

Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide, the lanthanum oxide and the cerium oxide existed on the peripheries of the Rh particles, and were further coated with lanthanum-alumina.

Example 4

In pure water, PVP-Rh colloid (made by Tanaka Kikinzoku Kogyo K.K.; Rh concentration: 2.0 wt %) was dispersed into commercially available composite compound powder of zirconium oxide-neodymium oxide (primary particle diameter: 18 nm), and was stirred by a magnetic stirrer for approximately two hours. Next, the solvent was removed, and a resultant was dried at 150° C. for 12 hours, and was thereafter fired at 400° C. Powder thus obtained was wet-milled by a ball mill. To slurry taken out of the ball mill, polyvinylpyrrolidone (average molecular weight: 8000) was added, and a mixture was heavily stirred, whereby colloid was obtained. No sedimentation was observed in this colloid even after the colloid was left day and night. Meanwhile, aluminum isopropoxide, lanthanum isopropoxide and cerium acetylacetonate were mixed into hexylene glycol, and were dissolved in an oil bath of 120° C., whereby a solution was created. Into this hexylene glycol solution of the aluminum isopropoxide, the lanthanum isopropoxide and the cerium acetylacetonate, the colloid previously created was slowly dropped, and a temperature of a solution thus obtained was gradually raised in an oil bath while stirring the solution under a reduced pressure, whereby the solvent was evaporated.

Powder thus obtained was dried at 80° C. for six hours, and further at 150° C. for 12 hours, and was thereafter fired at 400° C. for one hour in an airflow.

In such a way, a catalyst was obtained, in which composite compounds of the zirconium oxide-neodymium oxide existed on the peripheries of the Rh particles, and were further coated with lanthanum-cerium-alumina.

Example 5

PVP-Rh colloid (made by Tanaka Kikinzoku Kogyo K.K.; Rh concentration: 2.0 wt %), oxy zirconium nitrate and yttrium nitrate 6-hydrate were dispersed into pure water, and were stirred by a magnetic stirrer for approximately two hours. Next, 25% ammonia water was dropped into a dispersed resultant, and the resultant was coprecipitated, followed by stirring for 12 hours. Thereafter, the resultant was repeatedly mixed with pure water and filtered until pH of the solvent becomes substantially neutral. Meanwhile, aluminum propoxide and zirconium butoxide were mixed with hexylene glycol. Into such a mixed solution of the aluminum propoxide, the zirconium butoxide and the hexylene glycol, the solution containing the coprecipitated product, which was previously created, was slowly dropped, and a temperature of a solution thus obtained was gradually raised in an oil bath while stirring the solution under a reduced pressure, whereby the solvent was evaporated.

Powder thus obtained was dried at 80° C. for six hours, and further at 150° C. for 12 hours, and was thereafter fired at 400° C. for one hour in an airflow.

In such a way, a catalyst was obtained, in which composite compounds of the zirconium oxide-yttrium oxide existed on the peripheries of the Rh particles, and were further coated with zirconia-alumina.

Example 6

An acidic solution of rhodium nitrate (Rh concentration: 8.1 wt %) was dispersed into commercially available zirconium oxide sol (primary particle diameter: 15 nm), and was stirred by a magnetic stirrer for approximately two hours. Meanwhile, titanium isopropoxide was mixed with hexylene glycol. Into a mixed solution of the titanium propoxide and the hexylene glycol, a mixture of the rhodium and the zirconium oxide sol, which was previously prepared, was slowly dropped in an oil bath of 80° C. In such a way, titanium hydroxide was formed on the peripheries of the rhodium and the zirconium oxide.

Thereafter, a temperature of the oil bath was gradually raised while stirring a solution thus obtained under a reduced pressure, whereby the solvent was evaporated.

Powder thus obtained was dried at 80° C. for six hours, and further at 150° C. for 12 hours, and was thereafter fired at 400° C. for one hour in an airflow.

In such a way, a catalyst was obtained, in which the zirconium oxide existed on the peripheries of the Rh particles, and were further coated with titania.

Comparative Example 1

Comparative example 1 is an example of the conventional catalyst in which the rhodium particles are supported on the alumina.

Commercially available active alumina (specific surface area: 100 $m^2/g$) was dispersed into pure water, lanthanum nitrate 6-hydrate was mixed therewith, and a resultant was stirred by magnetic stirrer for approximately two hours. After the solvent was evaporated, the resultant was dried at 150° C. for 12 hours, and was fired at 400° C. for one hour in an airflow. Powder thus obtained was dispersed into pure water, an acidic solution of rhodium nitrate (Rh concentration: 8.1 wt %) was mixed therewith, and a resultant mixture was stirred by a magnetic stirrer for approximately two hours. Next, after the solvent was evaporated, the mixture was dried at 150° C. for 12 hours, and was fired at 400° C. for one hour in an airflow.

In such a way, a catalyst was obtained, in which the Rh particles were supported on lanthanum oxide-alumina.

Comparative Example 2

Comparative example is an example where the rhodium particles were supported on the compound particles, but the oxides which suppress the coagulation of the compound particles were not formed.

Commercially available composite compounds of zirconium oxide-lanthanum oxide were dispersed into pure water, an acidic solution of rhodium nitrate (Rh concentration: 8.1 wt %) was mixed therewith, and a resultant mixture was stirred by a magnetic stirrer for approximately two hours. Next, after the solvent was evaporated, the mixture was dried at 150° C. for 12 hours, and was fired at 400° C. for one hour in an airflow.

In such a way, a catalyst was obtained, in which the Rh particles were supported on the composite compounds of zirconium oxide-lanthanum oxide.

Example 7

Commercially available composite compounds of zirconium oxide-lanthanum oxide (primary particle diameter: 15 nm) were milled by a bead mill (bead diameter: 0.1 mm), and a median diameter thereof, which was measured by a laser-scattering grain distribution meter, was set at 150 nm. Into slurry thus obtained, an acidic solution of rhodium nitrate (Rh concentration: 8.1 wt %) was dispersed, and was stirred for approximately two hours. Meanwhile, boehmite slurry was prepared, in which boehmite, nitric acid and pure water were mixed together. Then, the slurry previously created was mixed with the boehmite slurry, followed by stirring.

Thereafter, a temperature of an oil bath was gradually raised while stirring the slurry under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Moreover, a surface area of the compound clusters, which was calculated from the median diameter and a mixed amount of the oxides and the compounds after the milling by the bead mill, was a value in Table 2.

Example 8

Commercially available composite compounds of zirconium oxide-lanthanum oxide (primary particle diameter: 15 nm) were dispersed into an aqueous solution in which an acidic solution of rhodium nitrate (Rh concentration: 8.1 wt %) and pure water were mixed together, followed by stirring for one hour. Slurry thus obtained was subjected to evaporation to dryness in a drying furnace at 150° C. for 12 hours, was subjected to particle grading, and was thereafter fired at 400° C. for one hour in an airflow.

Powder of the composite oxides of the zirconium oxide-lanthanum oxide, which was created as above and had Rh supported thereon, was dispersed into pure water, and was milled by a bead mill (bead diameter: 0.1 mm), whereby a median diameter thereof, which was measured by a laser-scattering grain distribution meter, was set at 150 nm. Meanwhile, boehmite slurry was created, in which boehmite, lanthanum nitrate hydrate and pure water were mixed together. Then, the slurry previously created was mixed with the boehmite slurry, followed by stirring.

Thereafter, a temperature of an oil bath was gradually raised while stirring the slurry under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Moreover, a surface area of the compound clusters, which was calculated from the median diameter and a mixed amount of the oxides and the compounds after the milling by the bead mill, was a value in Table 2.

Example 9

Sol was created, in which zirconium oxide sol, lanthanum oxide sol, an aqueous solution of hexaammine Rh (Rh concentration: 1.02 wt %) and pure water were mixed together. Meanwhile, boehmite slurry was created, in which boehmite, lanthanum nitrate hydrate, cerium nitrate hydrate and pure water were mixed together. Then, the boehmite slurry was mixed with the above-described sol, followed by stirring.

Thereafter, a temperature of an oil bath was gradually raised while stirring the sol under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of zirconium oxide and lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Moreover, a surface area of the compound clusters, which was calculated from the median diameter and a mixed amount of the oxides and the compounds after the milling by the bead mill, was a value in Table 2.

Example 10

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, an acidic solution of rhodium nitrate (Rh concentration: 8.1 wt %) was dispersed, and was stirred for approximately two hours. Meanwhile, boehmite slurry was prepared, in which boehmite, lanthanum nitrate hydrate, cerium nitrate hydrate and pure water were mixed together. Then, the boehmite slurry and the slurry previously created were mixed together, followed by stirring.

Thereafter, a temperature of an oil bath was gradually raised while stirring the slurry under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Example 11

Commercially available composite compounds of zirconium oxide-lanthanum oxide (primary particle diameter: 15 nm) were milled by a ball mill (ball diameter: 15 mm), whereby a median diameter thereof, which was measured by a laser-scattering grain distribution meter, was set at 2.5 μm. Into slurry thus obtained, an acidic solution of rhodium nitrate (Rh concentration: 8.1 wt %) was dispersed, and was stirred for approximately two hours. Meanwhile, boehmite slurry was prepared, in which boehmite, lanthanum nitrate hydrate, cerium nitrate hydrate and pure water were mixed together. Then, the boehmite slurry and the slurry previously created were mixed together, followed by stirring.

Thereafter, a temperature of an oil bath was gradually raised while stirring the slurry under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Moreover, a surface area of the compound clusters, which was calculated from the median diameter and a mixed amount of the oxides and the compounds after the milling by the ball mill, was a value in Table 2.

Example 12

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, an acidic solution of rhodium nitrate (Rh concentration: 8.1 wt %) was dispersed, and was stirred for approximately two hours. Meanwhile, boehmite slurry was prepared, in which boehmite, lanthanum nitrate hydrate, cerium nitrate hydrate and pure water were mixed together. Then, the boehmite slurry and the slurry previously created were mixed together, followed by stirring.

Thereafter, a temperature of an oil bath was gradually raised while stirring the slurry under a reduced pressure, whereby the solvent was evaporated. Powder thus obtained was dried at 80° C. for six hours, and further at 150° C. for 12 hours, and was thereafter fired at 400° C. for one hour in an airflow.

In such a way, a catalyst was obtained, in which composite particles of the zirconium oxide and the lanthanum oxide existed on the peripheries of the Rh particles, and were further coated with alumina.

Note that a molar ratio of the oxides to the compounds and a saturation molar ratio at the mixing time were adjusted so as to become ratios in Table 2.

Example 13

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, ammine-series rhodium salt was dispersed, and was stirred for approximately two hours. Meanwhile, boehmite slurry was prepared, in which boehmite, nitric acid and pure water were mixed together. Then, the boehmite slurry and the slurry previously created were mixed together, followed by stirring by a homogenizer.

At the mixing time, pH of the solution thus prepared was adjusted so as not to fall down below 4.5.

Thereafter, the mixed slurry was dried by a spray dryer (made by Yamato Scientific Co., Ltd.), and was thereafter fired at 550° C. for three hours in an airflow.

In such a way, a catalyst was obtained, in which composite particles of the zirconium oxide and the lanthanum oxide existed on the peripheries of the Rh particles, and were further coated with alumina.

Example 14

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, ammine-series rhodium salt was dispersed, and was stirred for approximately two hours. Meanwhile, boehmite slurry was prepared, in which boehmite, lanthanum nitrate, nitric acid and pure water were mixed together. Then, the boehmite slurry and the slurry previously created were mixed together, followed by stirring by a homogenizer.

At the mixing time, pH of the solution thus prepared was adjusted so as not to fall down below 4.5.

Thereafter, the mixed slurry was dried by a spray dryer (made by Yamato Scientific Co., Ltd.), and was thereafter fired at 550° C. for three hours in an airflow.

In such a way, a catalyst was obtained, in which composite particles of the zirconium oxide and the lanthanum oxide existed on the peripheries of the Rh particles, and were further coated with alumina.

Changes made from Example 13 are the doped amount of the lanthanum into the compounds A, the loading of La into the oxides B, and the supported amount of Rh.

Example 15

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, carboxylic acid-series rhodium salt was dispersed, and was stirred for approximately two hours. Meanwhile, boehmite slurry was prepared, in which boehmite, lanthanum nitrate, nitric acid and pure water were mixed together. Then, the boehmite slurry and the slurry previously created were mixed together, followed by stirring by a homogenizer.

At the mixing time, pH of the solution thus prepared was adjusted so as not to fall down below 4.5.

Thereafter, the mixed slurry was dried by a spray dryer (made by Yamato Scientific Co., Ltd.), and was thereafter fired at 550° C. for three hours in an airflow.

In such a way, a catalyst was obtained, in which composite particles of the zirconium oxide and the lanthanum oxide existed on the peripheries of the Rh particles, and were further coated with alumina.

Changes made from Example 13 are the change of the rhodium precursor salt, the loading of La into the oxides B, and the supported amount of Rh.

Example 16

Commercially available composite compounds of zirconium oxide-lanthanum oxide (primary particle diameter: 15 nm) were milled by a bead mill (bead diameter: 0.1 mm), whereby a median diameter thereof, which was measured by a laser-scattering grain distribution meter, was set at 150 nm. Into slurry thus obtained, carboxylic acid-series rhodium salt was dispersed, and was stirred for approximately two hours. Meanwhile, boehmite slurry was prepared, in which boehmite, lanthanum nitrate, cerium nitrate and pure water were mixed together. Then, the boehmite slurry and the slurry previously created were mixed together, followed by stirring by a homogenizer.

At the mixing time, pH of the solution thus prepared was adjusted so as not to fall down below 4.5.

Thereafter, the mixed slurry was dried by a spray dryer (made by Yamato Scientific Co., Ltd.), and was thereafter fired at 550° C. for three hours in an airflow.

In such a way, a catalyst was obtained, in which composite particles of the zirconium oxide and the lanthanum oxide existed on the peripheries of the Rh particles, and were further coated with alumina.

Changes made from Example 13 are the change of the rhodium precursor salt, the doped amount of La into the compounds A, the loading of La and Ce into the oxides B, and the supported amount of Rh.

Comparative Example 3

Commercially available composite compounds of zirconium oxide-lanthanum oxide (primary particle diameter: 15 nm) were milled by a ball mill (ball diameter: 15 mm), whereby a median diameter thereof, which was measured by a laser-scattering grain distribution meter, was set at 150 nm. Into slurry thus obtained, an acidic solution of rhodium nitrate (Rh concentration: 8.1 wt %) was dispersed, and was stirred for approximately two hours, and thereafter, the solvent was evaporated. Powder thus obtained was dried at 150° C. for 12 hours, and was thereafter fired at 400° C. for one hour in an airflow.

In such away, a catalyst was obtained, in which composite particles of the zirconium oxide and the lanthanum oxide existed on the peripheries of the Rh particles.

2. Preparation of Inner-Layer Catalyst Powder

Active alumina (specific surface area: 100 m²/g) was dispersed into a solution in which cerium nitrate 6-hydrate was dissolved into pure water, and was stirred by a magnetic stirrer for approximately two hours. After the solvent was evaporated, a resultant was dried at 150° C. for 12 hours, and was fired at 400° C. for one hour in an airflow. Powder thus obtained was dispersed into a solution in which an acidic aqueous solution of dinitrodiamine platinum (made by Tanaka Kikinzoku Kogyo K.K.; 8.83 wt %) and pure water were mixed together, and was stirred by a magnetic stirrer for two hours. After the solvent was evaporated, a resultant was dried at 150° C. for 12 hours, and was fired at 40° C. for one hour in an airflow, whereby cerium oxide-alumina on which Pt was supported was obtained.

3. Creation of Coating Layer on Honeycomb-Like Base 363.6 g of the catalyst powder obtained by an operation of the above-described preparation of the inner-layer catalyst powder, 50.9 of boehmite, 42.0 g of 10% nitric acid and 575.3 g of ion exchange water were put into a magnetic pot, and were subjected to vibration milling together with alumina balls, whereby catalyst slurry for the inner layer was obtained. A particle diameter of the slurry in this case was 2.8 μm.

Moreover, 363.6 g of each catalyst powder of the examples and the comparative examples, which was obtained by an operation of the above-described preparation of the surface-layer catalyst powder, 50.9 g of boehmite, 42.0 g of 10% nitric acid and 575.3 g of ion exchange water were put into a magnetic pot, and were subjected to vibration milling together with alumina balls, whereby catalyst slurry for each surface layer was obtained. A particle diameter of the slurry in this case was 2.8 μm.

The catalyst slurry for the inner layer was put into a ceramic-made honeycomb support (400 cells/6 mils, 1.2 L (liter, rest in the same way)), excessive slurry was removed therefrom by an airflow, and the catalyst slurry on the honeycomb support was dried at 120° C., and was fired at 400° C. in an airflow. A coated amount of the catalyst concerned was 100 g/L. Next, each catalyst slurry for the surface layer was applied on the honeycomb support in a similar way. A coated amount of the catalyst concerned was 100 g/L. In such a way, the catalysts of the examples and the comparative examples, which contained Pt by 1.0 g/L in the inner layers and Rh of the amounts individually shown in Table 1 in the surface layers, were obtained. The respective catalysts include, as the inner layers, coating layers containing Pt common to one another, and as the surface layers, coating layers containing Rh and the components of the examples and the comparative examples.

Moreover, in initial states of the catalysts before performing an endurance test to be described below, all of the particle diameters of the rhodium particles in the surface layers were 2 nm, and all of the particle diameters of the compound particles in the surface layers were 15 nm. Furthermore, the coating layers as the surface layers were investigated by using the TEM-EDX. Then, it was confirmed that, in all of the samples of Examples 1 to 6, 80% or more of the rhodium particles exited on the above-described compound particles.

4. Endurance Test of Catalyst

The endurance test was performed for each catalyst of the examples and the comparative examples. For the endurance test, catalyst converters were placed one by one on both banks of a V-type six-cylinder engine made by Nissan Motor Co., Ltd., and the endurance test was performed under conditions where unleaded gasoline was used as fuel for use, a catalyst inlet temperature was set at 900° C., and a testing time was 50 hours.

5. Catalyst Performance Evaluation Condition

A part of each catalyst subjected to the above-described endurance test was cut out to measure a volume thereof to 40 cc, and was assembled to a simulation exhaust gas flow apparatus. Model gas with a composition shown in Table 4 was introduced into the catalyst, and an inlet gas temperature was raised at a temperature raising rate of 10° C./min. An outlet gas composition was measured by a continuous analyzer, and from inlet and outlet gas concentrations thus obtained, an exhaust gas conversion rate at each temperature calculated. A temperature at which the outlet gas concentration was reduced to a half of the inlet gas concentration, that is, a temperature at which the conversion rate becomes 50% is represented as T50, and temperatures at each of which a conversion rate for HC becomes 50% are represented as HC-T50, and are listed in Table 1 to Table 3.

[Table 4]

TABLE 4

| Gas composition | Stoichiometric ratio |
| --- | --- |
| Z value (-) | 1 |
| A/F (-) | 14.5 |
| NO (ppm) | 1000 |
| CO (%) | 0.6 |
| $H_2$ (%) | 0.2 |
| $O_2$ (%) | 0.6 |
| $CO_2$ (%) | 13.9 |
| HC (ppmC) | 1665 |
| $H_2O$ (%) | 10 |
| $N_2$ (balance) | residue |

Gas flow rate: 40 L/min

As understood from catalyst performance evaluations shown in Table 1, in Examples 1 to 6 according to the present invention, the rhodium particles are not oxidized by being reacted with the alumina as in Comparative example 1, and in comparison with Comparative example 1, the rhodium particle diameters after the endurance test are small, and the coagulation of the rhodium particles is suppressed in such a manner that the rhodium particles are supported by the compound particles formed on the peripheries of the rhodium particles. Moreover, in comparison with Comparative example 2, the particle diameters of the compounds are small, and the coagulation of the compound particles is suppressed by forming the oxides. It is understood that, from this fact, the rhodium particle diameters after the endurance test have become small. Furthermore, in Examples 1 to 6, the temperatures of HC-T50 are low in comparison with Comparative examples 1 and 2, and it is understood that excellent exhaust gas purification performance is provided even after the endurance test.

As understood from catalyst performance evaluations shown in Table 2, in Examples 7 and 8 in each of which the oxide/compound molar ratio is 2 or less in the case where the saturation molar ratio is 1 or more, the rhodium particles are not oxidized by being reacted with the alumina as in Example 11 in which the oxide/compound molar ratio exceeds 2, the temperatures of HC-T50 are lower than in Example 11, and it is understood that more excellent exhaust gas purification performance is provided even after the endurance test. Moreover, in Examples 9 and 10 in each of which the cluster surface area of the compounds is 3.0 $m^2$/g or more in the case where the saturation molar ratio is less than 1, the coagulation of the rhodium particles is suppressed more and the temperature of HC-T50 is lower than in Example 12 in which the cluster surface area of the compounds is less than 3.0 $m^2$/g, and it is under that more excellent exhaust gas purification performance is provided even after the endurance test.

As understood from catalyst performance evaluations shown in Table 3, in Examples 13 to 16 in each of which the solution containing at least either of the carboxylic acid salt and the ammine complex salt is used as the rhodium solution used in order to support the rhodium particles on the compound particles, strong acidic solutions are used, and the coagulation of the rhodium particles is suppressed more and the temperatures of HC-T50 are lower than in Comparative example 3, and it is understood that more excellent exhaust gas purification performance is provided even after the endurance test.

The entire contents of Japanese Patent Application No. 2006-101580 filed to the Japan Patent Office on Apr. 3, 2006 are incorporated herein by reference.

The description has been made above of the embodiments to which the invention made by the inventors is applied; however, the present invention is not limited by the description and the drawings, which are according to theses embodiments and form a part of the disclosure of the present invention. It is additionally noted that, specifically, it is a matter of course that all of other embodiments, examples, application technologies and the like, which are made by those skilled in the art and the like based on the above-described embodiments, are incorporated in the scope of the present invention.

The invention claimed is:

1. An exhaust gas purifying catalyst, comprising:
a cluster comprising:
rhodium particles; and
compound particles which support and surround the rhodium particles, a component of the compound particles being an oxide containing Zr of 50 mol % or more; and
surrounding oxides which are formed on and surround a periphery of the cluster, and suppress coagulation of the compound particles.

2. The exhaust gas purifying catalyst according to claim 1, wherein an average particle diameter of the compound particles is 5 to 30 nm.

3. The exhaust gas purifying catalyst according to claim 1, wherein an average particle diameter of the rhodium particles is 2 to 10 nm.

4. The exhaust gas purifying catalyst according to claim 1, wherein 80% or more of the rhodium particles exists on the compound particles.

5. The exhaust gas purifying catalyst according to claim 1, wherein the surrounding oxides contain either of Al or Ti as a main component.

6. The exhaust gas purifying catalyst according to claim 1, wherein the compound particles further contain La.

7. The exhaust gas purifying catalyst according to claim 1, wherein, when a saturation molar ratio of the compound particles and the surrounding oxides in catalyst powder is defined by a saturation capacity ratio obtained by a following expression:

Saturation capacity ratio=(surrounding oxide capacity $[m^3/g] \times 47$)/(compound capacity $[m^3/g] \times 53$), in a case where the saturation molar ratio is 1 or more, a molar ratio of the surrounding oxides and the compounds is 2 or less.

8. The exhaust gas purifying catalyst according to claim 1, wherein, when a saturation molar ratio of the compound particles and the surrounding oxides in catalyst powder is defined by a saturation capacity ratio obtained by a following expression:

Saturation capacity ratio=(surrounding oxide capacity $[m^3/g] \times 47$)/(compound capacity $[m^3/g] \times 53$), in a case where the saturation molar ratio is less than 1, a cluster surface area of the compound particles is 3.0 $m^2/g$ or more.

9. The exhaust gas purifying catalyst according to claim 1, wherein the compound particles further contain La, and a content of La is 1 to 5 mol %.

10. The exhaust gas purifying catalyst according to claim 1, wherein the cluster has a diameter of 200 nm or less, the rhodium particles have an average particle diameter of 2 to 10 nm, and the compound particles have an average primary particle diameter of 5 to 30 nm.

11. The exhaust gas purifying catalyst according to claim 1, wherein primary particles of the compound particles surround peripheries of the rhodium particles.

12. The exhaust gas purifying catalyst according to claim 1, wherein primary pores having a pore diameter of 10 to 20 nm are formed on peripheries of the rhodium particles, and secondary pores having a pore diameter of 50 to 100 nm among the clusters are formed.

13. The exhaust gas purifying catalyst according to claim 1, wherein the cluster has a diameter of 100 nm or less.

14. The exhaust gas purifying catalyst according to claim 1, wherein the surrounding oxides contain $Al_2O_3$ derived from boehmite.

15. The exhaust gas purifying catalyst according to claim 1, wherein the surrounding oxides contain $Al_2O_3$ derived from aluminum isopropoxide.

16. The exhaust gas purifying catalyst according to claim 1, wherein a component of the surrounding oxides is an oxide containing Al of 50 mol % or more, and the oxide containing Al is derived from boehmite.

17. The exhaust gas purifying catalyst according to claim 1, wherein the surrounding oxide further contain an oxide of La, Ce, Zr, Nd or Y.

18. A method for producing the exhaust gas purifying catalyst of claim 1, the method comprising the steps of:
creating powder in which the rhodium particles are supported on the compound particles with an average particle diameter of 30 nm or less; and
milling or dispersing the powder, and thereafter forming colloid in which the compound particles supporting the rhodium particles are dispersed.

19. The method for producing the exhaust gas purifying catalyst of claim 18,
wherein a rhodium solution used in order to support the rhodium particles on the compound particles is a solution containing at least either of carboxylic acid salt or ammine complex salt.

20. A method for producing the exhaust gas purifying catalyst of claim 1, the method comprising the step of:
dispersing rhodium or a rhodium precursor into an oxide sol solution containing the compound particles with an average particle diameter of 30 nm or less in order to support the rhodium particles on the compound particles.

* * * * *